(12) United States Patent
Haswell et al.

(10) Patent No.: US 7,603,609 B2
(45) Date of Patent: *Oct. 13, 2009

(54) METHOD AND SYSTEM FOR OPTIMIZED INSTRUCTION FETCH TO PROTECT AGAINST SOFT AND HARD ERRORS

(75) Inventors: Jonathan M Haswell, San Jose, CA (US); Kevin G Kramer, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/753,127

(22) Filed: May 24, 2007

(65) Prior Publication Data

US 2007/0220299 A1 Sep. 20, 2007

Related U.S. Application Data

(63) Continuation of application No. 10/604,141, filed on Jun. 27, 2003, now Pat. No. 7,278,083.

(51) Int. Cl.
*H03M 13/00* (2006.01)
(52) U.S. Cl. .................................. 714/758; 714/763
(58) Field of Classification Search ................. 714/758, 714/763
See application file for complete search history.

(56) References Cited

U.S. PATENT DOCUMENTS

| | | | | |
|---|---|---|---|---|
| 4,394,763 A * | 7/1983 | Nagano et al. ................. | 714/6 |
| 4,456,993 A * | 6/1984 | Taniguchi et al. .............. | 714/6 |
| 4,535,455 A * | 8/1985 | Peterson ........................ | 714/6 |
| 4,617,660 A * | 10/1986 | Sakamoto ...................... | 714/6 |
| 4,646,312 A | 2/1987 | Goldsbury et al. | |
| 4,791,642 A | 12/1988 | Taylor et al. | |
| 4,920,539 A * | 4/1990 | Albonesi ..................... | 714/764 |
| 5,912,906 A | 6/1999 | Wu et al. | |
| 6,108,753 A | 8/2000 | Bossen et al. | |
| 6,161,208 A | 12/2000 | Dutton et al. | |
| 6,393,504 B1 * | 5/2002 | Leung et al. ................. | 710/104 |
| 6,397,365 B1 * | 5/2002 | Brewer et al. ............... | 714/766 |
| 6,625,749 B1 * | 9/2003 | Quach .......................... | 714/10 |
| 6,725,414 B2 * | 4/2004 | Seyyedy ...................... | 714/773 |
| 6,779,148 B2 * | 8/2004 | Tanaka ........................ | 714/753 |
| 6,912,682 B1 * | 6/2005 | Aoki ........................... | 714/764 |
| 2001/0047497 A1 | 11/2001 | Larson et al. | |
| 2002/0053042 A1 * | 5/2002 | Brown .......................... | 714/7 |
| 2004/0205433 A1 * | 10/2004 | Gower et al. ................ | 714/733 |
| 2004/0209420 A1 * | 10/2004 | Ljungcrantz et al. ........ | 438/239 |

* cited by examiner

*Primary Examiner*—M. Mujtaba K Chaudry
(74) *Attorney, Agent, or Firm*—DeLio & Peterson, LLC; Peter W. Peterson

(57) ABSTRACT

A method of detecting error during transfer of instructions from a data memory to a computer processor. At the time of the commencement of transmission of the instructions, the raw data signal is checked for an error detection code indicating data corruption. If the error detection code indicates no data corruption, the transmission of the instruction to the computer processor is completed. However, if data corruption is indicated, the raw data signal is substituted with a predetermined reserved signal or instruction and transmitted to the computer processor. An attempt is made to correct the corrupted data in the raw data signal and, if it is corrected, the corrected data signal is subsequently retrieved and the corrected data signal is processed by the computer processor. The corrupted raw data signal in the data memory may be replaced with the corrected data signal.

18 Claims, 2 Drawing Sheets

METHOD AND SYSTEM FOR OPTIMIZED INSTRUCTION FETCH TO PROTECT AGAINST SOFT AND HARD ERRORS

BACKGROUND OF THE INVENTION

1. Field of the Invention

This invention relates to the field of computerized data processing and, in particular, to a method and system for detecting error and implementing error correction during transfer of instructions from memory to a computer processor.

2. Description of Related Art

Embedded systems typically have a computer processor and an attached instruction memory unit that feeds instructions to be executed by the processor. The instruction unit must minimize instruction access time by providing a fast path to stored code. If instructions are not provided at the rate in which they are executed, the processor will stall, and precious cycles will be wasted waiting for code.

As embedded computer memory scales to smaller and smaller sizes, soft error rates have increased significantly. This is due in major part to the ever-increasing integration factor and decreasing feature dimensions. Unfortunately, soft errors can cause major problems in embedded systems. One example of particular concern is executing an incorrect instruction. If a soft error mutates an instruction, problems running the gamut from corrupted data to system failure can arise. None of this is acceptable in most applications. Even worse yet, the error may not be immediately obvious, making detection and correction more difficult.

An error correcting code (ECC) technique is generally used to improve data integrity. ECC involves adding a number of check bits to a data word in order to detect and correct one or more bits that have flipped while the data was stored. Unfortunately, ECC generally carries a penalty with its use. The data word and check bits must be decoded to determine if correction is needed and which bit to correct. Typically, one or more additional clock cycles are required in order to accomplish this correction, and ECC implementations generally suffer this performance penalty. However, since data integrity is crucial, the tradeoff in performance is made.

An example of a prior art ECC mechanism for accessing instructions can be found in U.S. Pat. No. 6,108,753, which employs an automatic retry when an ECC or parity error is detected. Unfortunately, this method may suffer a performance penalty because the processor cannot assume it will have a valid instruction in all cases. Therefore, the processor must wait for an error determination before deciding whether or not it can proceed.

In the error detection and correction system of U.S. Pat. No. 4,646,312, a parity error signal pauses the processor clock when asserted. During this pause, ECC correction is done on correctable data, and the processor clock is restarted when corrected data is available. Though this method improves performance execution over waiting for corrected data each cycle, the error signal must be able to halt clocks before an invalid instruction is executed. However, adding the ability to halt clocks to a processor can seriously limit pipelining within the processor, translating to extended latency and lower performance. Further, the delay from halting the clock during ECC correction of a corrupted instruction is experienced regardless of whether or not the instruction in question is actually executed. This is due to the fact that the delay occurs during retrieval.

SUMMARY OF THE INVENTION

Bearing in mind the problems and deficiencies of the prior art, it is therefore an object of the present invention to provide an improved method and system for detecting error during transfer of data signals from a data memory, particularly instructions from an instruction memory, to a computer processor.

It is another object of the present invention to provide a method and system for detecting error during transfer of data signals from a data memory that maximizes data integrity.

A further object of the invention is to provide a method and system for detecting error during transfer of data signals from a data memory that permits correction of the error with fewer penalties to performance of the processor.

The above and other objects, which will be apparent to those skilled in the art, are achieved in the present invention which is directed to a method of detecting error during transfer of data signals from a data memory to a computer processor comprising initially commencing transmission of a raw data signal from a data memory to a computer processor, wherein the raw data signal includes an error detection code. At the time of the commencement of transmission of the raw data signal from the data memory to the computer processor, the method then includes checking the raw data signal for corruption based on its error detection code. If the data has not been corrupted, the method includes completing transmission of the raw data signal to the computer processor. However, if the error detection code indicates data corruption, the method then includes substituting the raw data signal with a predetermined reserved data signal and transmitting the predetermined reserved signal to the computer processor. Further, the method includes processing the raw data signal or the reserved signal with the computer processor. If the error detection code indicates data corruption, the method may further include determining if the corrupted data in the original raw data signal may be corrected, and subsequently retrieving the corrected data and processing the corrected data signal with the computer processor.

If the computer processor processes the predetermined reserved signal, the method may also include determining whether corrupted data in the raw data signal has been corrected, and, if corrected, subsequently retrieving the corrected data and processing the corrected data signal with the computer processor. If the corrupted data in the raw data signal has been corrected, the raw data signal in the data memory may be replaced with the corrected raw data signal.

If the computer processor processes a predetermined reserved instruction, the computer processor may execute an error handling routine comprising determining whether corrupted data in the raw data signal has been corrected, and, if corrected, retrieving the corrected data signal, processing the corrected data signal with the computer processor, and replacing the raw data signal in the data memory with the corrected data signal.

Preferably the computer processor operates on timed, uniform clock cycles, and the steps of transmitting the raw data signal from the data memory to a computer processor, simultaneously checking the raw data signal for corruption, and transmitting either the raw or predetermined reserved signal to the computer processor, are all performed within a single clock cycle.

The method further preferably includes commencing transmission of a subsequent raw data signal from the data memory to the computer processor and repeating the aforementioned steps for the subsequent raw data signal, until all desired raw data signals from the data memory are processed by the computer processor.

The checking of the raw data signal for presence of data corruption is preferably performed simultaneously with the commencement of transmission of the raw data signal from the data memory to the computer processor.

Preferably, the error detection code may comprise ECC code, and the raw data signal may be a multi-bit data signal. More preferably, the raw data signal is an instruction from a random access memory associated with the computer processor.

In another aspect, the present invention is directed to a program storage device readable by a machine, tangibly embodying a program of instructions executable by the machine to perform the aforementioned method steps for detecting error during transfer of raw data signals from a data memory to a computer processor.

In a further aspect, the present invention is directed to a system for detecting error during transfer of data signals from a data memory to a computer processor comprising a computer processor and a data memory device containing raw data to be processed by the computer processor, wherein the raw data being in the form of a raw data signal including an error detection code. The system further includes a data checker device adapted to check the raw data for presence of data corruption and, if the error detection code indicates data corruption, determining if the corrupted data in the original raw data may be corrected. The system also includes a computer processor instruction unit. The instruction unit is adapted to commence transmission of a raw data from the data memory device to the computer processor and cause the data checker device to check the raw data signal for corruption via decode of the data and error detection code. The instruction unit is further adapted to cause completion of transmission of the raw data to the computer processor if the error detection code indicates no data corruption or, if the error detection code indicates data corruption, cause substitution of the raw data with a predetermined reserved instruction and transmission of the predetermined reserved instruction to the computer processor.

The computer processor, upon processing a predetermined reserved instruction, may be adapted to execute an error handling routine comprising determining whether corrupted data in the raw data has been corrected, and, if corrected, retrieving the corrected data, processing the corrected data with the computer processor, and replacing the raw data in the data memory device with corrected data.

The computer processor may include a clock, such that the processor adapted to operate on timed, uniform clock cycles produced by the clock. Preferably, the computer processor instruction unit is adapted to cause transmission of the raw data from the data memory device to the computer processor, the data checker device is adapted to check simultaneously the raw data for presence of data corruption, and the computer processor instruction unit is adapted to transmit either the raw or predetermined reserved instruction to the computer processor, within every cycle.

The system may further include a corrected data register adapted to receive raw data corrected by the data checker device and transmit corrected raw data to the computer processor. The data memory is preferably a random access memory associated with the computer processor and the raw data is preferably an instruction from the random access memory for the computer processor.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1 and 2 of the drawings in which like numerals refer to like features of the invention.

In its preferred embodiment, the present invention provides a method and apparatus to allow an instruction on-chip memory unit (I-OCM) associated with a computer processor to implement error correcting code (ECC) to maximize data integrity while minimizing performance overhead. An example of a computer processor is the PowerPC 405 manufactured by the assignee, International Business Machines Corporation of Armonk, N.Y. The term data is to be understood to include instructions to be executed by the computer processor. The invention implements ECC code to protect against soft and hard errors while providing instructions in a timely manner to avoid stalling the processor operation. When an error is detected, the unit replaces the corrupt instruction on the fly. This will then allow the processor to retrieve the corrected instruction in a subsequent operation. Thus the processor only incurs a performance penalty when an error is actually encountered rather than on every memory access, and improves the classic data integrity vs. performance penalty trade-off.

Figure 1:
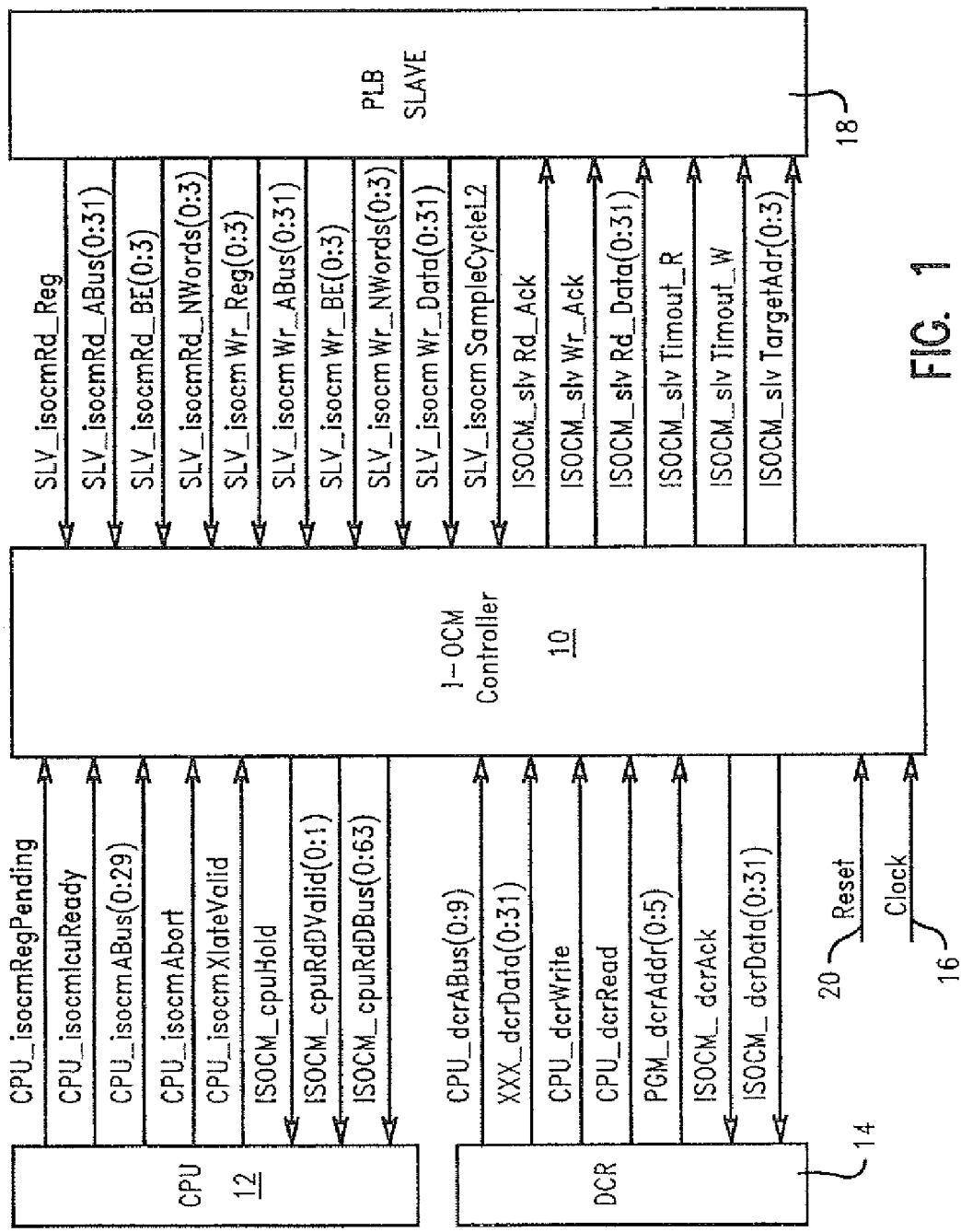
FIG. 1 is a schematic view of the preferred instruction memory controller of the present invention.

As shown in FIG. 1, an instruction side on-chip memory (I-OCM) unit 10 provides instructions to the computer processor unit (CPU) 12 via the processor's I-OCM interface 11. The purpose of the I-OCM unit is to minimize CPU instruction access time by providing a fast path to stored code. The I-OCM also provides the capability for code to be read from other data sources over the processor local bus (PLB) slave 18 and to be updated on the fly, thus enabling dynamic error detection and correction. The corrected data register (DCR) 14 stores instructions or other data that has been corrected. As is standard, CPU 12 includes a clock, and the processor operates on timed, uniform clock cycles produced by the clock. Clock 16 and reset 20 inputs are provided to I-OCM controller 10.

The interface signals shown in FIG. 1 are described below in Table 1:

TABLE 1

| Signal Name | I/O | Interface | Description |
|---|---|---|---|
| CPU_isocmReqPending | IN | CPU | One of a set of signals which In various combinations indicate a processor request for one or two 32-bit instructions. It is asserted by the processor to indicate that a fetch request is pending in the CPU. |
| CPU_isocmIcuReady | IN | | Another in the set of signals used to generate a fetch request from the processor. When asserted with ReqPending, a new fetch request is being presented. |
| CPU isocmABus(0:29) | IN | | Address of the instruction(s) being requested by the CPU. |
| CPU-isocmXlateValid | IN | | Part of the group of signals used by the processor to request an instruction fetch. This signal normally has an additional function to validate storage attributes, however, that function is not being used in this design. |
| CPU_isocmAbort | IN | | Indicates that the currently outstanding fetch request is being aborted. No RdDValid bits may be asserted for the associated request after the cycle in which the Abort is asserted, If ReqPending is asserted along with Abort, a new fetch request is being presented. |
| ISOCM-cpuHold | OUT | | The Hold signal is asserted by the ISOCM to indicate to the processor that it is working on its request, but unable to complete the transfer during the current cycle. |
| ISOCM-cpuRdDValid(0:1) | OUT | | Validates data words presented to the processor on RdDBus(0:63) lines. Bit 0: Even word data valid an RdDBus (0:31) Bit 1: Odd word data valid on RdDBus (32:63) |
| ISOCM-cpuRdDBus(0:63) | OUT | | 64-bit data bus used to transfer instructions to the CPU. |
| SLV_isocmRd_Req | IN | PLB | Read request signal |
| SLV_isocmWr_Req | IN | | Write request signal |
| SLV_isocmRd_Abus(0:31) | IN | | Read address |
| SLV_isocmWr_Abus(0:31) | IN | | Write address |
| SLV_isocmRd_BE(0:3) | IN | | Read byte enables |
| SLV_isocmWr_BE(0:3) | IN | | Write byte enables |
| SLV_isocmRd_Nwords(0:3) | IN | | Read number of words |
| SLV_isocmWr_Nwords(0:3) | IN | | Write number of words |
| SLV_isocmWr_Data(0:31) | IN | | Write data bus |
| SLV_isocmSampleCycleL2 | IN | | PLB Sample Cycle to synchronize PLB activity when running at higher frequencies |
| ISOCM_slvRd_Ack | OUT | | Read Acknowledge |
| ISOCM_slvWr_Ack | OUT | | Write acknowledge |
| ISOCM_slvRd_Data(0:31) | OUT | | Read data bus |
| ISOCM_slvTimeout_R | OUT | | Array access error detected on read |
| ISOCM_slvTimeout_W | OUT | | Array access error detected on write |
| ISOCM_slvTargetAdr | OUT | | Target Address of read data |
| PGM_dcrAddr(0:5) | IN | DCR Bus | Programmable DCR unit select |
| CPU dcrRead | IN | | Indicates that the CPU is requesting to read data |
| CPU-dcrWrite | IN | | Indicates that the CPU is requesting to write data |
| CPU_dcrABus(0:9) | IN | | Indicates the address of the DCR which is being accesses for a read or write DCR operation |
| XXX_dcrData(0:31) | IN | | The 32-bit data bus output to transfer write data from the CPU. This bus also drives 0x00000000 during DCR read operations |

TABLE 1-continued

| Signal Name | I/O | Interface | Description |
| --- | --- | --- | --- |
| ISOCM_dcrAck | OUT | | Indicates that the DCR data is available on ISOCM_cpuDBusin(read), or that the new DCR data is latched (write) |
| ISOCM-dcrData(0:31) | OUT | | The 32-bit data bus used to transfer read data from a DCR to the CPU |

Figure 2:
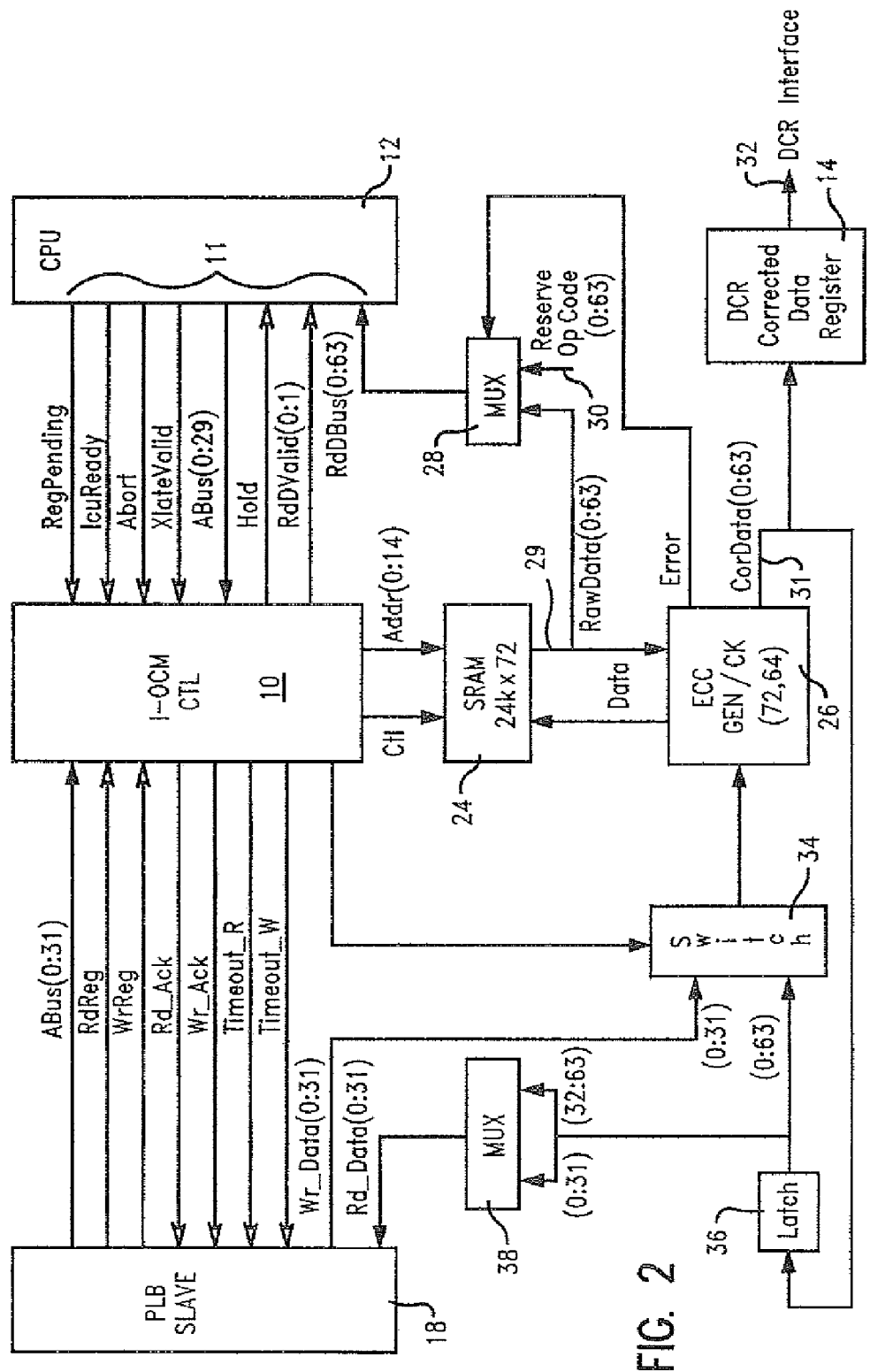
FIG. 2 is a schematic view of the instruction memory controller of FIG. 1 showing additional preferred components in accordance with the present invention.

FIG. 2 shows details of the preferred system, wherein I-OCM unit 10 contains a large static random access memory (SRAM) 24 or other data memory device for instruction or other data code storage which is accessible for reads from CPU 12, and for both reads and writes over PLB 18. The I-OCM control unit 10 supplies instructions from the instruction SRAM 24 to CPU 12, via fetches over the CPU I-OCM interface 11. Normally, these instructions are the raw, uncorrected output of the SRAM, which provides the best performance path.

CPU transfers require valid requests before CPU instruction fetches may be made. During the CPU instruction fetches, the preferred CPU I-OCM interface 11 handles data as 64 or 32 bit transfers. The 72 bit SRAM data word width includes 64 data bits and 8 ECC check bits. In normal operation, raw, uncorrected SRAM data (minus the check bits) are transferred during a CPU access in order to minimize the number of cycles required for an instruction fetch. While SRAM 24 is retrieving the data, the I-OCM unit 10 signals its intention to provide the instruction to CPU 12 in the next cycle, to minimize the instruction access time. When the data is available from the SRAM 24, the instruction unit causes transmission of the raw data 29 from SRAM 24 to the MUX 28 and error correcting code, generation checking (ECC GEN/CK) unit 26 to test for data corruption, for example due to a soft error in SRAM 24. However, if the data is corrupt, there is not enough time to correct it, since the system is preferably optimized for the non-error case.

In accordance with the present invention, I-OCM unit 10 continues to provide an instruction within the same CPU clock cycle, even when the instruction read from SRAM 24 is corrupt. If an ECC error is detected in the data fetched from the SRAM, instead of passing on the corrupt instruction, I-OCM unit 10 swaps in a predetermined error-indicating signal or instruction 30 in place of the retrieved corrupted data, and presents it to CPU 12 via the multiplexer (MUX) 28, also within the same CPU clock cycle. The predetermined error-indicating signal is a properly formed but reserved instruction or operation code. An attempt is also made at the same time by ECC GEN/CK 26 to determine if the error is correctable, and then to correct the corrupted data by known correction techniques. Any corrected data 31 which has been processed by ECC GEN/CK 26 will then be stored in the I-OCM corrected data register (DCR) 14.

If and when computer processor 12 attempts to execute the predetermined reserved error-indicating signal or reserved op-code 30, an interrupt is taken. The interrupt handler preferably then proceeds as follows with an error handling routine:

1. Determine if the error was correctable by reading the I-OCM status register.
2. If the error was correctable, read the corrected data or instruction 31 from the I-OCM corrected data register (DCR) 14 via the DCR bus or interface 32. Then write the corrected data or instruction 31 back to SRAM 24, to substitute for the corrupted raw data 29, via a PLB 18 write (discussed further below).
3. If the error was not correctable, retrieve the correct original data or instruction from a back-up memory area attached to the PLB.
4. Continue CPU 12 processing with the corrected instruction.

The predetermined error-indicating signal that is substituted for the corrupt data signal or instruction therefore serves several purposes. First, it prevents a protocol violation on I-OCM interface 11 by providing an instruction when one was promised. Second, if the instruction is never executed, due to an immediately preceding jump instruction, there is no delay in continued processor execution, though the SRAM may still be corrected later if desired. Finally, when the substituted instruction is executed, it preferably causes processor 12 to execute an error handling routine which can retrieve the corrected instruction stored by I-OCM unit 10, update SRAM 24, and continue execution of the instructions. Though this may take multiple cycles, the performance penalty is only paid when an error is encountered. Amortized over millions of instructions, the penalty for vastly improved data integrity is minimized.

For PLB-originating writes of the corrected data or instruction, I-OCM controller 10 provides the capability to load code into SRAM 24 via PLB 18. However, since the PLB Slave 18 interface is only 32 bits, each of these writes must actually be a read-modify-write to the 72 bit wide ECC-protected SRAM. The read-modify-write will basically be transparent to the PLB interface. I-OCM controller 10 may perform all of the steps necessary for the write as follows:

1. Latch in the PLB address bus and 32 bit write data.
2. Wait until any currently executing I-OCM interface 11 request has completed.
3. Initiate an SRAM read of raw data 29 from the specified address.
4. Wait for ECC-corrected data 31 to be generated and stored in the corrected data register, DCR 14.
5. Using switch 34, combine the 32 bit write data from PLB 18 with the complementary half of the corrected data 31 from corrected data register, DCR 14, via latch 36.
6. Initiate an SRAM write, which will regenerate the ECC check bits and store the new 72 bit double word into the SRAM.

The read-modify-write operation will likely take multiple CPU clock cycles, so subsequent PLB accesses to the instruction side of SRAM 24 may be delayed.

A PLB read of data or instruction from instruction side of SRAM 24 is somewhat simpler than a write, requiring I-OCM controller 10 to perform the following steps:

1. Latch in the PLB address bus.
2. Wait until any currently executing I-OCM interface 11 request has completed.

3. Initiate an SRAM read of raw data 29 from the specified address.

4. Wait for ECC-corrected data 31 to be generated.

5. Choose the upper or lower half of the corrected data via MUX 38 depending on the requested address.

A PLB read from I-SRAM will likely take multiple CPU cycles to complete.

In the ECC operations, I-OCM controller 10 preferably utilizes a (72,64) Error Correcting Code to improve the reliability of the Instruction SRAM. Eight check bits are appended to the 64 data bits to provide single error correction and double error detection. All occurrences of both correctable (single bit) and uncorrectable (multiple bit) errors will cause the appropriate status/interrupt bits to be set in the I-OCM status/interrupt register. The I-OCM Interrupt will be asserted only when an uncorrectable error has been detected as a result of either a PLB or OCM interface request.

Thus, the present invention provides an improved method and system for detecting instruction error during transfer of data signals from a data memory to a computer processor. The invention permits the processor to proceed whether or not an error is detected in the accessed instruction, and the processor is only delayed when an error-indicating signal or instruction is actually executed. The method and system of the present invention therefore maximizes data integrity while permitting correction of the error with fewer penalties to performance of the processor.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention,

What is claimed is:

1. A method of detecting error during transfer of data signals from a data memory to a computer processor comprising:

commencing transmission of a raw data signal and an error detection code for the raw data signal from a data memory to a computer processor;

at the time of the commencement of transmission of the raw data signal from the data memory to the computer processor, checking the raw data signal for corruption based on its error detection code;

if the data has not been corrupted, completing transmission of the raw data signal to the computer processor, if the error detection code indicates data corruption, substituting the raw data signal with a predetermined reserved data signal and transmitting the predetermined reserved signal to the computer processor;

processing the data signal with the computer processor.

2. The method of claim 1 wherein, if the error detection code indicates data corruption, further including determining if the corrupted data in the raw data signal may be corrected, and subsequently retrieving the corrected data and processing the corrected data signal with the computer processor.

3. The method of claim 1 further including, if the computer processor processes the predetermined reserved signal, determining whether corrupted data in the raw data signal has been corrected, and, if corrected, retrieving the corrected data signal and processing the corrected data signal with the computer processor.

4. The method of claim 1 further including, if the corrupted data in the raw data signal has been corrected, replacing the raw data signal in the data memory with the corrected raw data signal.

5. The method of claim 1 further including, if the computer processor processes a predetermined reserved signal, the computer processor executes an error handling routine comprising determining whether corrupted data in the raw data signal has been corrected, and, if corrected, retrieving the corrected data signal, processing the corrected data signal with the computer processor, and replacing the raw data signal in the data memory with the corrected data signal.

6. The method of claim 1 further including commencing transmission of a subsequent raw data signal from the data memory to the computer processor and repeating the aforementioned steps for the subsequent raw data signal, until all desired raw data signals from the data memory are processed by the computer processor.

7. The method of claim 1 wherein the raw data signal is a multi-bit data signal.

8. The method of claim 1 wherein checking of the raw data signal for corruption by decoding the data and error detection code is performed simultaneously with the commencement of transmission of the raw data signal from the data memory to the computer processor.

9. The method of claim 1 wherein the raw data signal is an instruction from a random access memory associated with the computer processor.

10. A system for detecting error during transfer of data signals from a data memory to a computer processor comprising:

a computer processor;

a data memory device containing raw data and an error detection code for the raw data to be processed by the computer processor, the raw data being in the form of a raw data signal;

a data checker device adapted to check the raw data for corruption and, if the error detection code indicates data corruption, correcting the corrupted data in the raw data; and a computer processor instruction unit, the instruction unit adapted to commence transmission of a raw data from the data memory device to the computer processor and cause the data checker device to check the raw data signal for corruption, the instruction unit further adapted to cause completion of transmission of the raw data to the computer processor if the error detection code indicates no data corruption or, if the error detection code indicates data corruption, cause substitution of the raw data with a predetermined reserved instruction and transmission of the predetermined reserved instruction to the computer processor.

11. The system of claim 10 wherein the computer processor, upon processing a predetermined reserved instruction, is further adapted to execute an error handling routine comprising determining whether corrupted data in the raw data has been corrected, and, if corrected, retrieving the corrected data, processing the corrected data with the computer processor, and replacing the raw data in the data memory device with corrected data.

12. The system of claim 10 further including a corrected data register adapted to receive data corrected by the data checker device and transmit corrected data to the computer processor.

13. The system of claim 10 wherein the data memory device is a random access memory associated with the computer processor and the raw data is an instruction from the random access memory for the computer processor.

14. A program storage device readable by a machine, embodying a program of instructions executable by the machine to perform method steps for detecting error during transfer of a raw data signal and an error detection code for the raw data signal from a data memory to a computer processor, the raw data signal including an error detection code, the method comprising:

- at the time of the commencement of transmission of the raw data signal from the data memory to the computer processor, checking the raw data signal for corruption;
- if the error detection code indicates no data corruption, completing transmission of the raw data signal to the computer processor,
- if the error detection code indicates data corruption, substituting the raw data signal with a predetermined reserved data signal and transmitting the predetermined reserved signal to the computer processor;
- processing the data signal with the computer processor.

15. The program storage device of claim 14 wherein, if the error detection code indicates data corruption, the method further includes determining if the corrupted data in the raw data signal may be corrected, and subsequently retrieving the corrected data and processing the corrected data signal with the computer processor.

16. The program storage device of claim 14 wherein the method further includes, if the computer processor processes the predetermined reserved instruction, determining whether corrupted data in the raw data signal has been corrected, and, if corrected, retrieving the corrected data signal and processing the corrected data signal with the computer processor.

17. The program storage device of claim 14 wherein the method further includes, if the corrupted data in the raw data signal has been corrected, replacing the raw data signal in the data memory with the corrected data signal.

18. The program storage device of claim 14 wherein the error detection code comprises ECC code, and the raw data signal is an instruction from a random access memory associated with the computer processor.

* * * * *